3,076,834
CHELATE-PHENOL ADDUCTS
Frederick H. Norton, Concord, Calif., assignor to The Dow Chemical Company, Midland, Mich., a corporation of Delaware
No Drawing. Filed Mar. 4, 1960, Ser. No. 12,671
10 Claims. (Cl. 260—438)

This invention relates to chelate-phenol adducts. More specifically it relates to phenol adducts of metal chelates of β-dicarbonyl compounds as hereinafter more fully defined.

These chelate-phenol adducts are crystalline solids varying in color from white to deep purple. They are soluble in many organic solvents such as acetone, dimethylformamide, benzene and methylene chloride; slightly soluble in such solvents as diethyl ether, ethanol, pentane, hexane, kerosene and xylene; and substantially insoluble in water and aqueous alkali. These compounds have many uses but are particularly useful as parasiticides and are adapted to be employed in antimicrobial and insecticidal compositions.

These chelate phenol adducts may be represented by the structure $$M(R)_n \cdot (ArOH)_q$$

In this and succeeding formulas, $M(R)_n$ represents a metal chelate of a β-dicarbonyl compound in which M represents the metal ion portion of the chelate, R represents the dicarbonyl portion of the chelate, $n$ represents an integer having a value equal to the valence of the metal ion, ArOH represents the phenol component and $q$ represents a number having a value from about 0.5 to about 5. The exact value of $q$ has been found to vary with the particular metal chelate and the particular phenol employed in the preparation of the adduct. In viewing the compositions of the present invention from the standpoint of ratio of phenol to chelate it is expected from theoretical considerations that the complex contain one mole of a phenol, ArOH, for each mole of a dicarbonyl group in the metal chelate. It has been found, however, that in many instances the ratio of phenol to the dicarbonyl of the chelate is far less than 1.0 while in other instances, the proportion of chelate is substantially greater than 1.0. The present invention is, therefore, concerned with adducts of metal chelates and phenols as hereinbefore and hereinafter set forth without the limitation of theoretical considerations. It has been found that the ratio of phenol to the dicarbonyl of the chelate varies from about 0.15 to about 2.5 although in most cases the ratio is from about 0.4 to 1.5, and in the preferred species the ratio is from 0.5 to 1.0. These adducts are sometimes formed with 0.5 to 3 moles of water of hydration.

β-Dicarbonyl compounds which are suitable for the formation of metal chelates for the compositions of the present invention are those having the linkage:

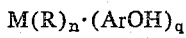

in the unchelated form. The β-dicarbonyl compounds in the enolized form

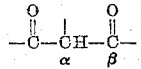

combine with polyvalent metals to form chelates. These β-dicarbonyl compounds should be substantially free of acidic or basic groups but may contain non-interfering neutral groups such as lactone, ester, carbonyl, halo, etc. β-Dicarbonyl compounds which may be employed for the preparation of metal chelates include acetylacetone (2,4-pentanedione), benzoylacetone (1-phenyl-1,3-butanedione), benzoyltrifluoroacetone, dibenzoylmethane, dithenoylmethane, furoylacetone, 2-furoylbenzoylmethane, 2-furoyltrifluoroacetone, hexafluoroacetylacetone, C-methylacetylacetone (3-methyl-2,4-pentanedione), β-naphthoyltrifluoroacetone, 2-thenoylacetone, 2-thenoylbenzoylmethane, 2-thenoyl-2-furoylmethane, thenoyltrifluoroacetone and trifluoroacetylacetone. Preferred dicarbonyl compounds in the practice of the present invention are 2,4-pentanedione, dehydroacetic acid, 3-methyl-2,4-pentanedione and 1-phenyl-1,3-butanedione.

The metal ion of the chelates of β-dicarbonyl compounds are polyvalent metals known to form metal complexes with β-dicarbonyl compounds such as chromium, cobalt, copper, iron, manganese, nickel, titanium, vanadium, rhodium, iridium, palladium, zirconium and others. Preferred metal components have a valence of 2 or 3 and include aluminum, copper, iron, nickel, chromium, cobalt and zinc.

The phenol component of the adduct defined by ArOH includes phenol, alkylphenols, phenylphenols or halophenols. The preferred phenols of the adduct include phenol and substituted phenols wherein in said substituted phenol the ring substituents may be chloro, bromo, lower alkyl containing from 1 to 4 carbon atoms, inclusive, or phenyl or those having a mixture of said substituents and may number from 1 to 5. Suitable phenols include phenol, o-phenylphenol, p-phenylphenol, o-cresol, m-cresol, p-cresol, m-tertiary-butylphenol, p-tertiary-butylphenol, carvacrol, thymol, 2,3-xylenol, 2,4-xylenol, 2,5-xylenol, 2,6-xylenol, 3,4-xylenol, m-isopropylphenol, 2,3,4,6-tetramethylphenol, 2,3,5,6-tetramethylphenol, 2,4,6-tri-tertiary-butylphenol, 2-bromo-4-chlorophenol, 2-bromo-4,6-dichlorophenol, 2,6-dibromo-4-chlorophenol, 2-chloro-4-phenylphenol, 2,3,4-trichlorophenol, 2,3,6-trichlorophenol, 2,4,5-trichlorophenol, 4-bromophenol, 2-bromophenol, 2,4-dibromophenol, 4-chloro-m-cresol, 2-chloro-4,6-dibromophenol, pentachlorophenol, 2,3,5,6-tetrachlorophenol, 2,3,4,5-tetrachlorophenol, 2,3,4,6-tetrachlorophenol, 2,3,5,6-tetrachloro-p-cresol, 3,4,5,6-tetrabromo-o-cresol, 2,4,6-trichlorophenol, 3,4-dichlorophenol, 2,3-dichlorophenol, 2,5-dichlorophenol, 2,6-dichlorophenol, 2,4-dichlorophenol, 2,3,6-tribromo-p-cresol, 2,4,6-trichloro-m-cresol, 2,4,6-tribromo-m-cresol, 4-chlorophenol, 3-chlorophenol, 2-chlorophenol, 4,6-dibromo-o-cresol, 2,5-dibromo-p-cresol, 3,6-dibromo-2-chloro-p-cresol, 2-bromo-4-phenylphenol, 4-bromo-2-phenylphenol, 4-chloro-2-phenylphenol and 6-chloro-2-phenylphenol.

The phenol-chelate adducts of the present invention may be prepared by reacting a metal chelate of a β-dicarbonyl compound with a phenol, ArOH. Any proportion of the reactants may be employed, some of the desired product being formed under any conditions. Preferably, an excess of the phenol is employed, the exact amount depending on the valence of the metal in the chelate. Thus, when the valence of the metal forming the chelate is 3, at least three moles of phenol are preferably employed for each mole of the chelate compound. When the metal forming the chelate is a divalent metal, at least two moles of the phenol are preferably employed. The reaction is usually carried out in a solvent. Suitable solvents include diethyl ether, pentane, hexane and benzene. The reaction may be carried out at temperatures between about 0° C. and 150° C., although a temperature of from 25° to 100° C. is considered preferable. Reaction time varies between 30 minutes and about 7 hours, although in most cases, 3 to 6 hours is preferred. During the reaction, the product precipitates in the reaction mixture as a crystalline solid and may be removed therefrom by conventional procedures.

In one method for carrying out the reaction, a metal chelate of β-dicarbonyl compound and a phenol, preferably in molar excess, are mixed together. The reaction is preferably carried out in an inert solvent and heated at the reflux temperature of the solvent. After completion of the reaction, the reaction mixture is poured into water or dilute aqueous alkali to precipitate the desired product and to dissolve most of the unreacted starting materials. The crude product is recovered by filtration and thereafter purified by washing with water and organic solvents.

The chelate phenol adducts may be prepared by an alternative method wherein an appropriate β-dicarbonyl compound, phenol and metal salt are reacted together. Suitable salts of the metal are inorganic salts. However, halides such as bromides and chlorides, are the preferred salts for carrying out this reaction. In this method, at least one mole of the β-dicarbonyl compound is employed for each equivalent of metal salt. The amount of phenol is not critical. The reaction may be carried out with or without solvent although inert solvents such as diethyl ether, benzene, pentane and hexane are advantageously employed. The reaction takes place in the temperature range of from 0° to about 150° C. in a period of from about ½ hour to 6 hours.

In a preferred method for carrying out the reaction, one equivalent of a metal as its hydrohalide salt and 1 mole each of a β-dicarbonyl and a phenol are mixed together with cooling. During the mixing, the reaction takes place with evolution of heat and hydrogen halide gas. After completion of the reaction, the reaction mixture is allowed to stand for several hours at room temperature whereupon the product usually precipitates in the reaction mixture. The mixture is then poured into excess water or dilute aqueous alkali to purify the product. The product is recovered by filtration, washed with water and thereafter freed of adsorbed solvent by vaporization at reduced pressure. The product may be further purified by treating the crude product with aqueous alkali to remove unreacted phenol and then recovering and drying by conventional procedures.

The following examples illustrate the present invention but are not to be construed as limiting.

EXAMPLE 1

*Aluminum 2,4-Pentanedione Chelate-Phenol Adduct*

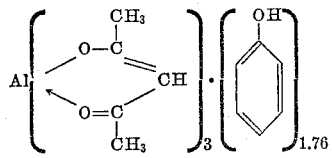

To a cooled mixture of 56.2 grams (0.6 mole) of phenol, 60 grams (0.6 mole) of 2,4-pentanedione and 60 milliliters of diethyl ether was added portionwise while stirring, 27 grams (0.202 mole) of anhydrous aluminum chloride. A reaction took place with a temperature rise in ten minutes of from 9° C. to 39° C. accompanied by evolution of hydrogen chloride gas and breaking up of the lumps of aluminum chloride to form a heavy yellow slurry. The reaction mixture was allowed to stand for two hours to obtain an aluminum 2,4-pentanedione chelate-phenol adduct product. The mixture was then poured into excess water to aid in the removal of hydrogen chloride by-product and unreacted reagents and the supernatant water and ether layers were removed by decantation. The pasty product recovered as residue was rinsed with water and thereafter dried for 2 hours in a vacuum oven maintained at 60° C. and about 2–5 millimeters of mercury pressure. The pasty product mass was then placed in water and the aqueous mixture (pH=2.3) neutralized with sodium hydroxide to pH of 6–7 to alkacid paper to dissolve unreacted phenol. The product mass was suction filtered and dried under reduced pressure to produce 78 grams of a purified aluminum 2,4-pentanedione chelate-phenol adduct product as a white crystalline solid melting at 121°–123° C. This product was found to contain 5.60 percent aluminum, 62.72 percent carbon and 6.62 percent hydrogen. The phenol present in the adduct was determined by bromination to tribromophenol (melting point 94–5° C.) and found to constitute 34 percent of the product. This corresponds to an adduct composition of $Al(C_5H_7O_2)_3 \cdot (C_6H_5OH)_{1.76}$. The theoretical values calculated for this adduct are 5.51 percent aluminum, 62.6 percent carbon and 6.48 percent hydrogen.

EXAMPLE 2

The adduct of Example 1 was also prepared by shaking together at room temperature 2 grams of phenol, 1 to 2 milliliters of 2,4-pentanedione and 1 to 2 grams of aluminum chloride in 2 milliliters of diethyl ether. A reaction took place with evolution of hydrogen chloride. The reaction mixture was allowed to stand overnight at room temperature whereupon the aluminum 2,4-pentanedione chelate phenol adduct product precipitated as a white crystalline solid. The mixture was poured into ice, and the product recovered by filtration, washed with water and dried. The product melted at 116.5°–118.5° C. and contained 5.51 percent aluminum.

EXAMPLE 3

*Aluminum 2,4-Pentanedione Chelate-4-Chlorophenol Adduct*

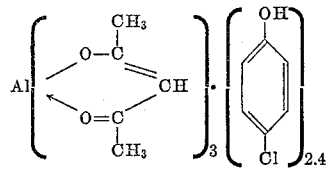

38.57 grams (0.3 mole) of 4-chlorophenol, 30.0 grams (0.3 mole) of 2,4-pentanedione and 13.34 grams (0.1 mole) of anhydrous aluminum chloride were mixed together while cooling in an ice bath and the mixture thereafter heated for four hours on a water bath to obtain an aluminum 2,4-pentanedione chelate-4-chlorophenol adduct as a solid product. The mixture was then poured into water, the product separated from the water by decantation and thereafter washed successively with water, 3 percent NaOH solution, and water until washings were free of base. The product after drying in vacuum oven four hours at 40°–45° C. and about 2 to 5 millimeters of mercury pressure was a brown crystalline solid melting from 64° C. to 68° C. The yield of the product having the composition

was 42 grams (0.67 mole) or 67 percent. The product contained 4.3 percent aluminum and 13.6 percent chlorine. The theoretical values are 4.3 percent aluminum and 13.5 percent chlorine. Infrared analysis confirmed the composition of the adduct as having the structure set forth above.

EXAMPLE 4

*Aluminum 2,4-Pentanedione Chelate-2,4-Dichlorophenol Adduct*

In an operation carried out in a similar manner, 33.4 grams (0.2 mole) of 2,4-dichlorophenol, 20 grams (0.2 mole) of 2,4-pentanedione and 8.9 grams (0.067 mole) of anhydrous aluminum chloride were heated together for four hours to produce an aluminum 2,4-pentanedione chelate-2,4-dichlorophenol adduct product as a solid. The latter was washed successively with water, 3 percent sodium hydroxide solution and water and thereafter dried four hours at 40°–45° C. and 1 hour at 50°–60° C. in a vacuum oven. The product was light brown crystalline solid melting from 85° to 88° C. and having the composition $Al(CH_3CO:CHCOCH_3)_3 \cdot (C_6H_3Cl_2OH)_{1.7}$. The yield of the product was 20 grams or 50 percent of theoretical. The product had an analysis of 4.7 percent aluminum and 20.3 percent chlorine. The theoretical values are 4.5 percent aluminum and 19.8 percent chlorine. Infrared analysis confirmed the above composition.

EXAMPLE 5

*Aluminum 2,4-Pentanedione Chelate-2,3,4,6-Tetrachlorophenol Adduct*

In a similar manner, 76.4 grams of 92 percent 2,3,4,6-tetrachlorophenol (0.3 mole), 30.0 grams (0.3 mole) of 2,4-pentanedione, and a solution of 13.34 grams (0.1 mole) of anhydrous aluminum chloride in 375 milliliters pentane were mixed together and refluxed 7 hours to produce an aluminum 2,4-pentanedione chelate-2,3,4,6-tetrachlorophenol adduct product as a solid. The product was recovered by decantation of supernatant pentane layer, washing the solid residue with water, 0.5 percent NaOH solution, water (until washings neutral) and pentane, and drying in vacuum oven at 50° to 60° C. for 3½ hours. The product was a light brown crystalline material melting from 88° to 98° C. and having the composition $Al(CH_3CO{:}CHCOCH_3)_3 \cdot (C_6HCl_4OH)_{2.4}$. Elemental analyses showed the product to contain 40.3 percent chlorine and 3.15 percent aluminum. Theoretical values for the composition are 3.1 percent aluminum and 38.8 percent chlorine. Infrared analysis confirmed this composition.

EXAMPLE 6

In a similar manner, adducts of various phenols with aluminum 2,4-pentanedione chelate were prepared. The adducts, with their composition and properties, are set forth in Table I.

meters of mercury. The product was further purified by washing with pentane and cooling to obtain 28 grams or 51.4 percent yield of yellow crystalline material, decomposing around 105° C. with some loss of phenol, and giving product which melted at 235° C. The aluminum dehydroacetic acid chelate-phenol adduct product contained 3.4 percent aluminum (theoretical 3.32 percent) and exhibited infrared spectrum consistent with the above structure.

EXAMPLE 8

*Copper 2,4-Pentanedione Chelate-2-Bromo-4-Phenylphenol Adduct*

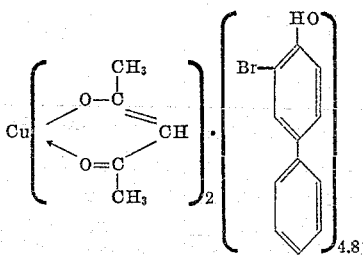

49.8 grams (0.2 mole) of 2-bromo-4-phenylphenol, 20.0 grams (0.2 mole) of 2,4-pentanedione and 13.45 grams (0.1 mole) of anhydrous cupric chloride were refluxed for 5 hours to obtain a copper 2,4-pentanedione chelate-2-bromo-4-phenylphenol adduct product. The re-

TABLE I

| Phenol component of aluminum 2,4-pentanedione adducts | Composition (confirmed by infrared spectral analyses) | Elemental analyses | | | | | | | | Physical properties | |
|---|---|---|---|---|---|---|---|---|---|---|---|
| | | Aluminum | | Chlorine | | Carbon | | Hydrogen | | Appearance | Melting point, °C. |
| | | Theoretical | Found | Theoretical | Found | Theoretical | Found | Theoretical | Found | | |
| Pentachlorophenol | $Al(CH_3CO{:}CHCOCH_3)_3 \cdot (C_6H_5OH)_{2.4}$ | 2.83 | 2.8 | 44.2 | 44.4 | | | | | Brown, crystalline | 110-120 |
| m-Tertiary-butylphenol | $Al(CH_3CO{:}CHCOCH_3)_3 \cdot (C_6H_4 \cdot C(CH_3)_3 \cdot OH)_{0.8}$ | 5.7 | 6.0 | | | 63.3 | 63.0 | 7.5 | 7.3 | White, crystalline | 85 -86 |
| o-Phenylphenol | $Al(CH_3CO{:}CHCOCH_3)_3 \cdot (C_6H_4 \cdot C_6H_5 \cdot OH)_{2.4}$ | 3.7 | 3.5 | | | | | | | Brown, crystalline | 44.5- 46.5 |
| 4-and 6-chloro-2-phenylphenol | $Al(CH_3CO{:}CHCOCH_3)_3 \cdot (C_6H_3 \cdot Cl \cdot C_6H_5 \cdot OH)_{1.7}$ | 4.0 | 4.43 | 9.0 | 9.9 | | | | | Light brown, crystalline | 83 - 86 |
| 2-chloro-4-phenylphenol | $Al(CH_3CO{:}CHCOCH_3)_3 \cdot (C_6H_3 \cdot Cl \cdot C_6H_5 \cdot OH)_{1.7}$ | 4.0 | 4.2 | 9.0 | 9.8 | | | | | Yellow-orange, crystalline | 87 - 91 |
| 2-bromo-4-phenylphenol | $Al(CH_3CO{:}CHCOCH_3)_3 \cdot (C_6H_3 \cdot C_6H_5 \cdot Br \cdot OH)_{2.3}$ | 2.63 | 2.8 | [1] 21.8 | [1] 23.7 | 56.3 | 53.7 | 4.8 | 4.4 | Light brown, crystalline | 40 - 55 |

[1] Elemental analysis for bromine.

EXAMPLE 7

*Aluminum Dehydroacetic Acid Chelate-Phenol Adduct*

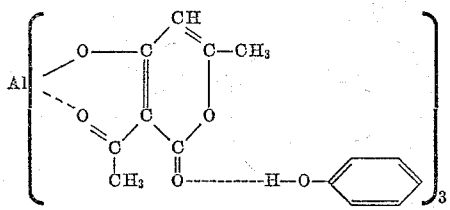

In a similar manner, 18.82 grams (0.2 mole) of phenol, 33.6 grams (0.2 mole) of dehydroacetic acid, and 8.9 grams (0.067 mole) of anhydrous aluminum chloride in 100 milliliters of anhydrous diethyl ether were mixed together while cooled by an ice bath, and thereafter heated at reflux temperature for 5½ hours. A reaction took place with evolution of hydrogen chloride gas. The mixture was then allowed to stand overnight to produce an aluminum dehydroacetic acid chelate-phenol adduct product. The crude product was washed with water, then heated under reduced pressure to vaporize the residual ether, washed successively with water, dilute alkali (to pH 6–7), water, and thereafter recovered by filtration and dried at 30°–50° C. at a pressure of about 2 to 5 milliaction mixture was then poured into water, ether evaporated and the residue chilled to complete precipitation of the product. The resulting precipitate was filtered, thoroughly washed with water and then with pentane, air dried to obtain the purified product as blue-violet crystalline material which melted at 75° C. and having the composition $Cu(CH_3CO{:}CHCOCH_3)_2 \cdot (C_6H_3 \cdot C_6H_5 \cdot Br \cdot OH)_{4.3}$. Elemental analyses showed 4.38 percent copper (theoretical 4.38 percent) and 31.14 percent bromine (theoretical 26.4 percent). Infrared analyses indicated an adduct having the above structure and containing excess of the phenol.

EXAMPLE 9

*Aluminum 2,4-Pentanedione Chelate-2,4-Dichlorophenol Adduct*

A mixture of 16.3 grams (0.10 mole) of 2,4-dichlorophenol and 5.4 grams (0.0165 mole) of aluminum trisacetylacetonate (aluminum 2,4-pentanedione chelate) in 25 milliliters absolute diethyl ether were refluxed for 6½ hours to obtain an aluminum 2,4-pentanedione chelate-2,4-dichlorophenol adduct product. The latter was recovered from the reaction mixture as a light brown crystalline material by adding the reaction mixture to water, decanting the supernatant liquor and chilling. The product was purified by washing in pentane several times and air drying to obtain a purified product melting at 880-89° C. and containing by elemental analyses 5.14 percent aluminum and 19.8 percent chlorine. Infrared analysis confirmed the composition $$Al(CH_3CO:CHCO:CH_3)_3(C_6H_3Cl_2OH)_{1.4}$$

having theoretical values of 4.9 percent for aluminum and 18.1 percent for chlorine and showed the product to be

EXAMPLE 12

In a manner similar to that described in Examples 9-11, 2-bromo-4-phenylphenol adducts of various dione metal chelates were prepared by heating together at reflux temperature of the inert solvent the dione metal chelates and phenols. The products and their physical properties are given in Table II.

TABLE II

| 2-bromo-4-phenyl-phenol adduct of— | Composition (confirmed by infrared spectral analysis) | Elemental analyses | | | | Physical properties | |
|---|---|---|---|---|---|---|---|
| | | Metal | | Bromine | | Appearance | Melting point, ° C |
| | | Theoretical | Found | Theoretical | Found | | |
| Copper 2,4-pentanedione chelate | $Cu(CH_3CO:CHCOCH_3)_2 \cdot (C_6H_3 \cdot C_6H_5 \cdot Br \cdot OH)_{2.5}$ | Cu 7.09 | 7.07 | 22.6 | 22.7 | Blue-violet crystalline. | 79-84 |
| Copper 1-phenyl-1, 3-butanedione | $Cu(C_6H_5CO:CHCOCH_3)_2 \cdot (C_6H_3 \cdot C_6H_5 \cdot Br \cdot OH)_{1.7}$ | Cu 7.86 | 7.82 | 16.72 | 17.44 | Grey-violet, crystalline. | 76 |
| Iron 2,4-pentanedione chelate | $Fe(CH_3CO:CHCOCH_3)_3 \cdot (C_6H_3 \cdot C_6H_5 \cdot Br \cdot OH)_{2.0}$ | Fe 5.59 | 5.64 | 20.8 | 21.9 | Red, crystalline. | 69-74 |
| Cobalt 2,4-pentanedione chelate | $Co(CH_3CO:CHCOCH_3)_3 \cdot (C_6H_3 \cdot C_6H_5 \cdot Br \cdot OH)_3$ | Co 5.08 | 4.02 | 20.07 | 18.16 | ....do........ | 75-82 |
| Copper 3-methyl-2, 4-pentanedione | $Cu(CH_3CO:CCH_3COCH_3)_2 \cdot (C_6H_3 \cdot C_3H_5 \cdot Br \cdot OH)_{1.0}$ | Cu 11.82 | 12.36 | 14.85 | 15.71 | Blue, crystalline. | 90-100 | essentially the same as that obtained as described in Example 4.

EXAMPLE 10

*Aluminum 2,4-Pentanedione Chelate-2,4,5-Trichlorophenol Adduct*

In a manner similar to that described in Example 9, 10.8 grams (0.3 mole) of aluminum trisacetylacetonate and 19.75 grams (0.1 mole) of 2,4,5-trichlorophenol in 50 milliliters of anhydrous diethyl ether were refluxed for 4½ hours; thereafter, the solvent was evaporated off, the residue chilled in a Dry Ice bath, followed by addition of chilled pentane to the residue to precipitate white crystalline aluminum 2,4-pentanedione chelate-2,4,5-trichlorophenol adduct product. The latter was further purified by washing with pentane to produce 15 grams (89 percent of theoretical) of a white crystalline product melting from 69° to 79° C., the product containing 5.19 percent aluminum and 24.8 percent chlorine. Infrared analysis confirmed the composition $$Al(CH_3CO:CH \cdot CO \cdot CH_3)_3 C_6H_2Cl_3OH_{1.2}$$

having theoretical values of 4.82 percent aluminum and 22.8 percent chlorine.

EXAMPLE 11

*Chromium 2,4-Pentanedione Chelate-Phenol Adduct*

In a manner similar to that described in Examples 9 and 10, 16.95 grams (0.18 mole) of phenol and 21.0 grams (0.06 mole) of chromic trisacetylacetonate (chromium 2,4-pentanedione chelate) in 75 milliliters of anhydrous diethyl ether were heated at reflux temperature for 6 hours, then allowed to stand at room temperature for several days to produce a chromium 2,4-pentanedione chelate-phenol adduct product as a purple solid. The latter was recovered from the reaction mixture and purified as previously described. The product melted at 120°-127° C. with some sublimation of phenol during the heating. The yield of the product was 30 grams or 93 percent of theoretical. The product had an infrared spectra consistent with the composition $$Cr(CH_3CO:CHCOCH_3)_3(C_6H_5OH)_2$$

and contained by analysis 9.57 percent chromium. The theoretical value is 9.67 percent chromium.

EXAMPLE 13

In a similar manner other phenol adducts of β-dicarbonyl compound metal chelates were prepared:

Nickel 2,4-pentanedione chelate-2-bromo-4-phenylphenol adduct melting from 72° to 80° C. from nickel 2,4-pentanedione chelate and 2-bromo-4-phenylphenol.

Zinc 2,4-pentanedione chelate-4-bromo-2-phenylphenol adduct melting from 78° to 83° C. from zinc 2,4-pentadione chelate and 4-bromo-2-phenylphenol.

Zinc 2,4-pentanedione chelate-2,4,5-trichlorophenol adduct melting from 63° to 65° C. with decomposition from anhydrous zinc chloride, 2,4-pentanedione and 2,4,5-trichlorophenol.

Cobalt 2,4-pentanedione chelate-2,4,5-trichlorophenol adduct melting above 300° C., from cobalt nitrate hexahydrate, 2-4-pentanedione and 2,4,5-trichlorophenol.

Aluminum 2,4-pentanedione chelate-4-(and 6-)-chloro-2-phenylphenol adduct melting from 128° to 132° C. from anhydrous aluminum chloride, 2,4-pentanedione and 4-(and 6-)-chloro-2-phenylphenol.

Zinc 2,4-pentanedione chelate-2,4,5-trichlorophenol adduct melting from 63.5° to 66° C. from anhydrous zinc chloride, 2,4-pentanedione and 2,4,5-trichlorophenol.

EXAMPLE 14

In similar operations adducts of dehydroacetic acid metal chelates are prepared as follows:

Copper dehydroacetic acid chelate o-cresol adduct having a formula and a molecular weight of 613 from cupric chloride dehydroacetic acid and o-cresol.

Nickel dehydroacetic acid chelate pentabromophenol adduct having a formula of and a molecular weight of 1370 from nickel chloride dehydroacetic acid and pentabromophenol.

EXAMPLE 15

In similar operations, the following adducts may be prepared: copper 3-methyl-2,4-pentanedione chelate-2,5-xylenol adduct, copper 2,4-pentanedione chelate-2-bromo-4,6-dichlorophenol adduct, cobalt 3-methyl-2,4-pentanedione chelate-2-bromo-4-phenylphenol adduct, cobalt 1-phenyl-1,3-butanedione chelate-thymol adduct, zinc 1-phenyl-1,3-butanedione chelate-p-tertiarybutylphenol adduct, iron 3 - methyl - 2,4 - pentanedione chelate-2,3,5,6-tetramethylphenol adduct and iron dehydroacetic acid chelate-2-chloro-4-phenylphenol adduct.

The products of this invention are useful as parasiticidal, insecticidal and antimicrobial agents. These compounds are particularly useful as antimicrobial agents for the preservation of synthetic latex and latex paint compositions against attack by microorganisms.

In separate representative operations as a latex preservative, chelate phenol adducts were added to commercial styrene-butadiene copolymer latex to produce a modified latex composition containing one of the adducts in varying concentrations. The pH of latex samples was 10.5. Fifty gram samples were inoculated with 0.1 milliliter portions of a mixed culture of eight organisms consisting largely of Pseudomonas, Bacillus and Proteus species, previously isolated from spoiled samples of α-protein, latex and latex paint. The inoculated samples were maintained at 30° C. for two weeks and thereafter multiple streaks made from these samples on poured nutrient agar plates and the streaked plates incubated at 30° C. for 48 hours. At the end of this period, the plates were examined for microbial growth. The results obtained from streaks made two weeks after inoculation are set forth in Table III. Check operations with the latexes containing no chelate-phenol adduct of the present invention gave heavy microbial growth.

The adducts of this invention are useful products for a variety of agricultural and industrial applications. They are, for example, useful as herbicides for the control of germination and growth of weeds and weed seeds of such species as radish, canary grass, rape, crab grass, Japanese millet, cotton, flax and wild oats. They are also useful for use as aquatic herbicides for the control of submersed and floating aquatic weeds such as waterweed, fanwort, moneywort and salvinia. In a representative operation of its use as an aquatic herbicide, copper 1-phenyl-1,3-butanedione chelate 2-bromo-4-phenylphenol adduct and aluminum 2,4-pentanedione chelate 2,3,4,6-tetrachlorophenol adduct were employed for the control of aquatic weed species, Anacharis. In such operations, substantially complete controls were obtained when in separate operations, the aquatic weed was exposed for 2 hours in tanks containing 400 parts by weight of one of the above adducts per million parts of aqueous medium.

The adducts are also useful as parasiticides, for the control of insects, microorganisms and plant pathogens and nematodes. In a representative use as a plant pathogen, substantially complete control of wheat rust disease was obtained when wheat plants susceptible to wheat rust disease caused by rust fungus (*Puccinia graminis-tritici*) were sprayed with an aqueous dispersion containing 0.50 pound of aluminum 2,4-pentanedione chelate 2,3,4,6-tetrachlorophenol adduct in 100 gallons of spray medium and thereafter inoculated with the disease organism.

I claim:

1. A phenol adduct of a metal chelate of a β-dicarbonyl compound, said phenol being selected from the group consisting of phenol, alkylphenols, phenylphenols, and halophenols, said metal being a polyvalent metal and said β-dicarbonyl compound having the

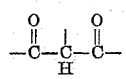

linkage in the unchelated form and being substantially free of acidic and basic groups; and wherein the ratio of the phenol to said metal chelate of the β-dicarbonyl compound is from about 0.5 to about 5.

2. A phenol adduct of a metal chelate of an enolizable β-dicarbonyl compound having the structure

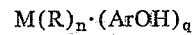

wherein $M(R)_n$ represents a metal chelate of a β-dicarbonyl compound, M is a polyvalent metal ion portion of the chelate and having a valence of from 2 to 3, inclusive, R is the β-dicarbonyl portion of the chelate, $n$ is an integer equal to the valence of the metal; ArOH is a phenol which may have up to and including 5 ring substituents, said substituents selected from the group consisting of chloro, bromo, lower alkyl containing from 1 to 4 carbon atoms, inclusive, and phenyl; and $q$ is a number having an average value from about 0.5 to about 5; and wherein in said adduct, the β-dicarbonyl component is substantially free of acidic and basic groups.

3. A phenol adduct of a metal chelate of a β-dicarbonyl compound, said phenol being selected from the group consisting of phenol and substituted phenols wherein in said substituted phenols the substituents are selected from the group consisting of chloro, bromo, lower alkyl containing from 1 to 4 carbon atoms, inclusive, phenyl and mixtures thereof and number from 1 to 5, inclusive, said metal being a polyvalent metal having a valence of from 2 to 3, inclusive, and selected from the group consisting

TABLE III

| Compound | Latex | | | | | |
|---|---|---|---|---|---|---|
| | Dow Latex 512K [1] | | Dow Latex 512R [2] | | Dow Latex 762W [3] | |
| | Concn. in percent by weight | Result | Concn. in percent by weight | Result | Concn. in percent by weight | Result |
| Cobalt 2,4-pentanedione chelate 2-bromo-4-phenylphenol adduct | 0.05 | Kill | 0.05 | Kill | 0.05 | Kill. |
| Copper 3-methyl-2,4-pentanedione chelate 2-bromo-4-phenylphenol adduct | 0.01 | do | 0.05 | do | 0.01 | Do. |
| Copper 1-phenyl-1,3-butanedione chelate 2-bromo-4-phenylphenol adduct | 0.05 | do | 0.01 | do | 0.05 | Do. |
| Aluminum dehydroacetic acid chelate phenol adduct | 0.05 | do | 0.05 | do | 0.05 | Do. |
| Cobalt 2,4-pentanedione chelate 2,4,5-trichlorophenol adduct | 0.01 | do | 0.05 | do | 0.05 | Do. |
| Copper 2,4-pentanedione chelate 2-bromo-4-phenylphenol adduct | 0.01 | do | 0.01 | do | 0.01 | Do. |
| Iron 2,4-pentanedione chelate 2-bromo-4-phenylphenol adduct | 0.05 | do | 0.05 | do | 0.05 | Do. |
| Aluminum 2,4-pentanedione chelate 2,4,5-trichlorophenol adduct | 0.05 | do | 0.05 | do | 0.05 | Do. |
| Aluminum 2,4-pentanedione chelate 2-bromo-4-phenylphenol adduct | 0.5 | do | 0.5 | do | 0.5 | Do. |
| Aluminum 2,4-pentanedione chelate 2,4-dichlorophenol adduct | 0.5 | do | 0.5 | do | 0.1 | Do. |
| Aluminum 2,4-pentanedione chelate 2-(and 4)-chloro-6-phenylphenol adduct | 0.5 | do | 0.1 | do | 0.1 | Do. |
| Aluminum 2,4-pentanedione chelate o-phenylphenol adduct | 0.5 | do | 0.1 | do | 0.1 | Do. |
| Aluminum 2,4-pentanedione chelate m-tert-butyl phenol adduct | 0.5 | do | 0.01 | do | 0.5 | Do. |
| Aluminum 2,4-pentanedione chelate pentachlorophenol adduct | 0.5 | do | 0.5 | do | 0.1 | Do. |
| Aluminum 2,4-pentanedione chelate phenol adduct | 0.05 | do | 0.1 | do | 0.1 | Do. |

[1] 60 percent styrene, 40 percent butadiene copolymer, 48 percent solids.
[2] 60 percent styrene, 40 percent butadiene copolymer, 48 percent solids.
[3] 67 percent styrene, 33 percent butadiene copolymer, 48 percent solids.

of aluminum, copper, iron, nickel, chromium, cobalt and zinc, and said β-dicarbonyl compound being selected from the group consisting of 2,4-pentanedione, dehydroacetic acid, 3-methyl-2,4-pentanedione and 1-phenyl-1,3-butanedione and being substantially free of acidic and basic groups; and wherein the ratio of the phenol to said metal chelate of the β-dicarbonyl compound is from about 0.5 to about 5.

4. Aluminum 2,4-pentanedione chelate-phenol adduct.

5. Aluminum dehydroacetic acid chelate-phenol adduct.

6. Copper 3-methyl-2,4-pentanedione chelate-2-bromo-4-phenylphenol adduct.

7. Copper 1-phenyl-1,3-butanedione chelate-2-bromo-4-phenylphenol adduct.

8. Aluminum 2,4-pentanedione chelate-2,3,4,5-tetrachlorophenol adduct.

9. A method for preparing a phenol adduct of a metal chelate of a β-dicarbonyl compound, said phenol being selected from the group consisting of phenol, alkylphenols, phenylphenols, and halophenols, said metal being a polyvalent metal having a valence of from 2 to 3, inclusive, and said β-dicarbonyl compound having the

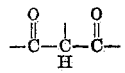

linkage in the unchelated form which comprises reacting a metal chelate of a β-dicarbonyl compound having the structure

in which M represents the polyvalent metal ion portion of the chelate having a valence of from 2 to 3, inclusive, R represents the β-dicarbonyl portion of the chelate and $n$ is an integer equal to the valance of the metal, with a molar excess of a phenol as above defined.

10. A method for preparing a phenol adduct of a metal chelate of a β-dicarbonyl compound, said phenol being selected from the group consisting of phenol, alkylphenols, phenylphenols and halophenols, said metal being a polyvalent metal having a valence of from 2 to 3, inclusive, and said β-dicarbonyl compound having the

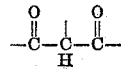

linkage in the unchelated form and being substantially free of acid and basic groups, which comprises mixing together (1) a metal halide, MX, wherein M is a polyvalent metal ion having a valence of from 2 to 3, inclusive, and X is selected from the group consisting of chloride and bromide, (2) a β-dicarbonyl compound, and (3) a phenol as above defined.

References Cited in the file of this patent
UNITED STATES PATENTS 2,983,743     Galat                   May 9, 1961

OTHER REFERENCES

J. Chem. Soc. (London), July 1954, pp. 2368–2372.

UNITED STATES PATENT OFFICE
CERTIFICATE OF CORRECTION

Patent No. 3,076,834            February 5, 1963

Frederick H. Norton

It is hereby certified that error appears in the above numbered patent requiring correction and that the said Letters Patent should read as corrected below.

Columns 7 and 8, TABLE II, second and fifth lines under the heading "2-bromo-4-phenyl-phenol adduct of-", should appear as shown below instead of as in the patent:

-- Copper 1-phenyl-1,3-butanedione chelate --;

and

-- Copper 3-methyl-2,4-pentanedione chelate --;

same table, second and fifth lines under the heading "Composition (confirmed by infrared spectral analysis)", should appear as shown below instead of as in the patent:

-- $Cu(C_6H_5CO:CHCOCH_3)_2 \cdot (C_6H_3 \cdot C_6H_5 \cdot Br \cdot OH)_{1.7}$ --;

and

-- $Cu(CH_3CO:CCH_3COCH_3)_2 \cdot (C_6H_3 \cdot C_6H_5 \cdot Br \cdot OH)_{1.0}$ --;

column 8, lines 55 to 61, the formula should appear as shown below instead of as in the patent:

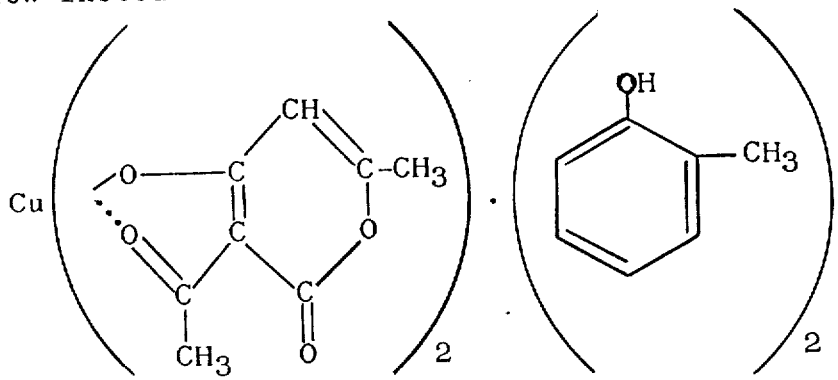

3,076,834

Columns 9 and 10, TABLE III, lines 12 and 13, under the heading "Compound", should appear as shown below instead of as in the patent:

-- Aluminum 2,4-pentanedione chelate
o-phenylphenol adduct --;

and

-- Aluminum 2,4-pentanedione chelate
m-tert.-butylphenol adduct --;

column 10, line 23, for "linage" read -- linkage --.

Signed and sealed this 14th day of January 1964.

(SEAL)
Attest:

ERNEST W. SWIDER
Attesting Officer

EDWIN L. REYNOLDS
Acting Commissioner of Patents